United States Patent [19]
De Castro Faria

[11] Patent Number: 5,725,435
[45] Date of Patent: Mar. 10, 1998

[54] ELECTRO-MECHANICAL AMUSEMENT SIMULATOR WITH GRAVITATIONAL EFFECTS

[76] Inventor: Mario Sergio De Castro Faria, Crispin Mira St., N° 171/302 Centro Floranopolis, SC, Brazil

[21] Appl. No.: 648,411

[22] Filed: May 15, 1996

Related U.S. Application Data

[63] Continuation of Ser. No. 416,795, Apr. 12, 1995, abandoned.

[30] Foreign Application Priority Data

Aug. 13, 1993 [BR] Brazil ................................ 9303426-1

[51] Int. Cl.$^6$ ................................................ A63G 31/02
[52] U.S. Cl. ................................................ 472/47; 472/59
[58] Field of Search ................................ 472/47, 59, 60, 472/130, 135; 434/29, 30, 34, 35, 55

[56] References Cited

U.S. PATENT DOCUMENTS

| | | | |
|---|---|---|---|
| 3,135,057 | 6/1964 | Nelson et al. | 472/130 |
| 4,710,128 | 12/1987 | Wachsmuth et al. | 434/30 X |
| 4,824,099 | 4/1989 | Rusu et al. | 434/55 |
| 5,052,932 | 10/1991 | Trani | 434/29 |

*Primary Examiner*—Kien T. Nguyen
*Attorney, Agent, or Firm*—Roper & Quigg

[57] ABSTRACT

A movement simulator that has a cabin (15) that rotates through the action of a servomotor (12). The cabin/servomotor set rests on an axis (xx') that has its rotation controlled by another servomotor (5). The set formed by the cabin and the two servomotors rests on a third axis (zz') that also has its rotation controlled by a third servomotor (1) in a way that all the moving components of the simulator have unlimited rotation, i.e., even beyond 360 degrees over its respective axes.

10 Claims, 4 Drawing Sheets

ELECTRO-MECHANICAL AMUSEMENT SIMULATOR WITH GRAVITATIONAL EFFECTS

This application is a continuation of Ser. No. 08/416,795, filed Apr. 12, 1995, now abandoned.

TECHNICAL FIELD

The present invention refers to a simulator with spinning movements in any direction in which the angles of the arcs can have unlimited values.

BACKGROUND ART

The prior art shows electro-mechanical simulators. Their movements are limited because they have only two axes which corresponds to an arc smaller than 360 degrees. These restrictions restrain the usage of graphic programs, and they limit the real forces.

DISCLOSURE OF INVENTION

The electro-mechanical simulator which is described provides the spinning around the three axes, in an individual or simultaneous ways, simulating various rotation movements. This simulation will provide gravitational sensations, centrifugal sensations, turbulences and others on an individual placed in a cabin. Its functioning is based on the use of servomotors which control the position and the spinning of the three axes.

The simulator can be better understood through the detailed description according to the FIGS. 1 to 7 that follow.

MODES FOR CARRYING OUT THE INVENTION

Figure 2:
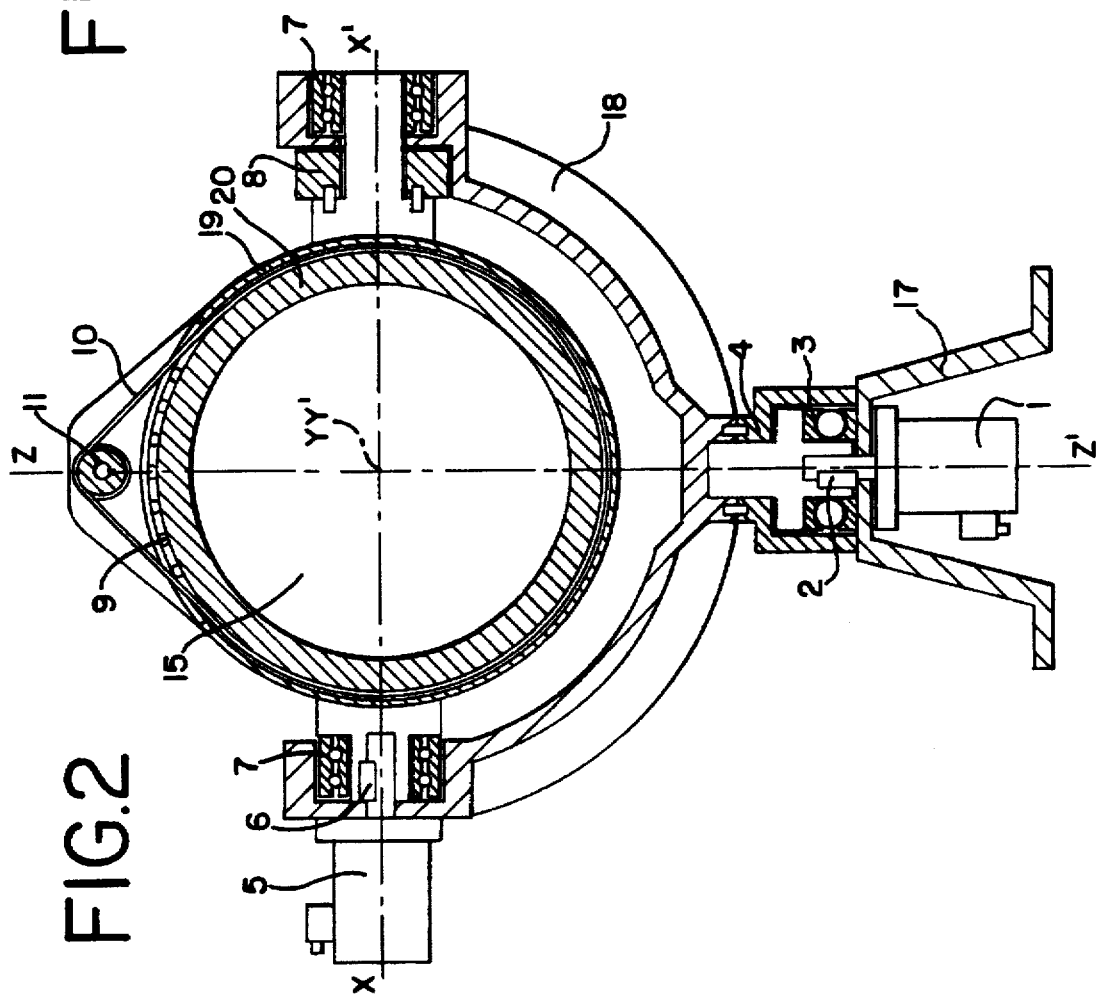
FIG. 2 is a view of a longitudinal cut of the simulator.

The simulator is comprised of three independent rotation systems, each one acting on an axis, as it is shown in FIG. 2, the XX' horizontal axis, the ZZ' vertical axis, and the YY' transversal one, forming the three axes.

Figure 1:
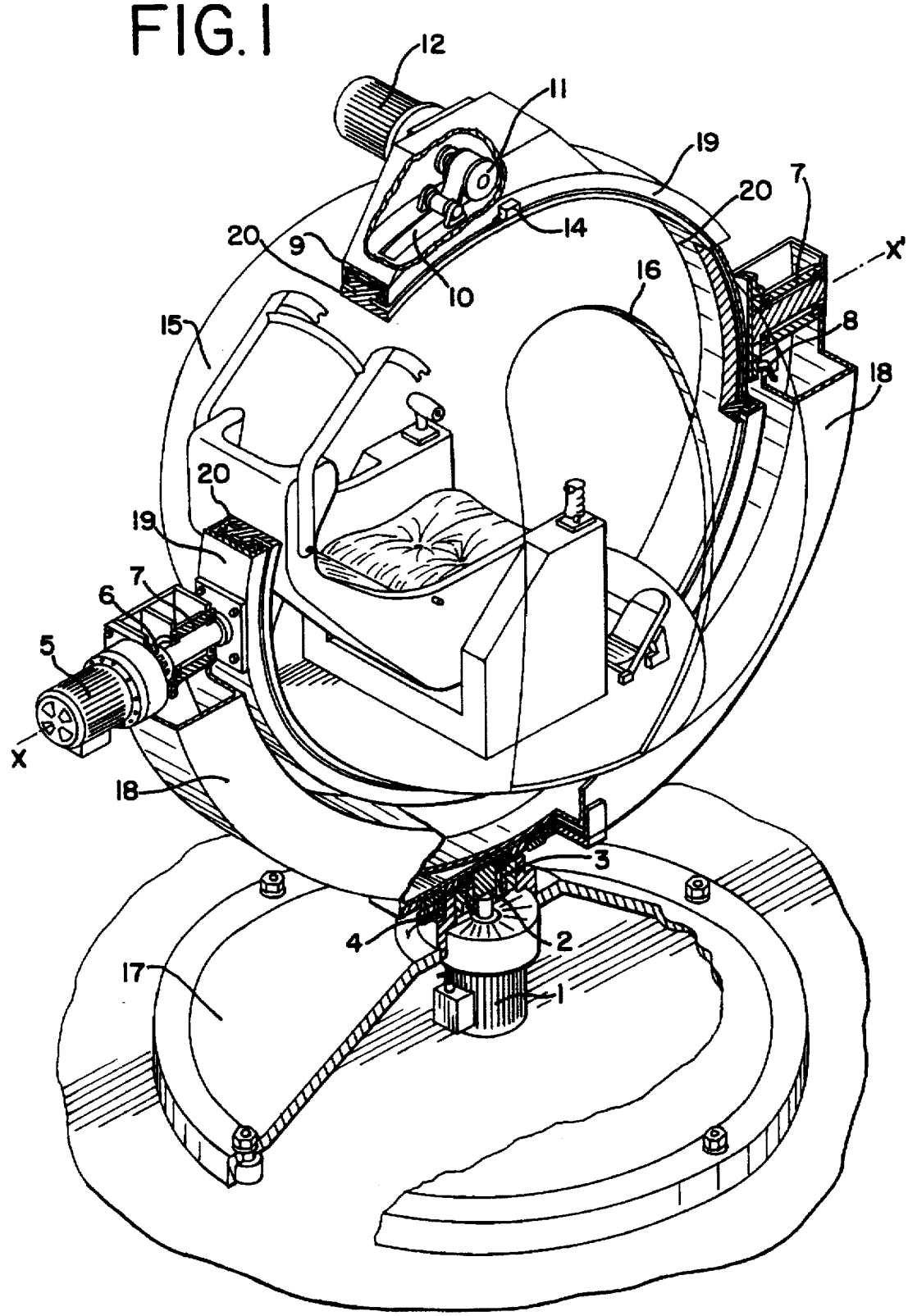
FIG. 1 is a perspective view of the simulator.

As we can observe in FIG. 1, the cabin (15) is supported by the inner ring (20) of the bearing (9). The external ring (19) of the bearing (9) has two extremities of axle aligned on XX' axis. These extremities of the axle are connected to the radial bearings (7). These radial bearings (7) are supported by the beam (18) which has a semi-arc form. The beam (18) is rotated in a bearing (3) fixed on the base (17).

The cabin movement around ZZ' axis is performed by a servomotor (1), which through a mechanical connection (2) of the bearing (3) and a first energy system (4) moves the semi-arc beam (18) around ZZ' axis. Everything that is fixed on the beam (18) will have rotation movement around ZZ' axis, with unlimited angle in the two directions.

The rotation subsystem around ZZ' axis has a structure of fixing of the servomotor (1), as well as the mechanical connection (2), the bearing (3) and an energy system (4) that already is known by the man of ordinary skill in the art, such as composed by energy brushes and energy rings.

The rotation subsystems of the XX' and YY' axes get energy through known means from the energy system (4). The amount of pairs of rings and brushes is defined according to the number of engines and equipment to be moved or supplied independently.

Figure 6:
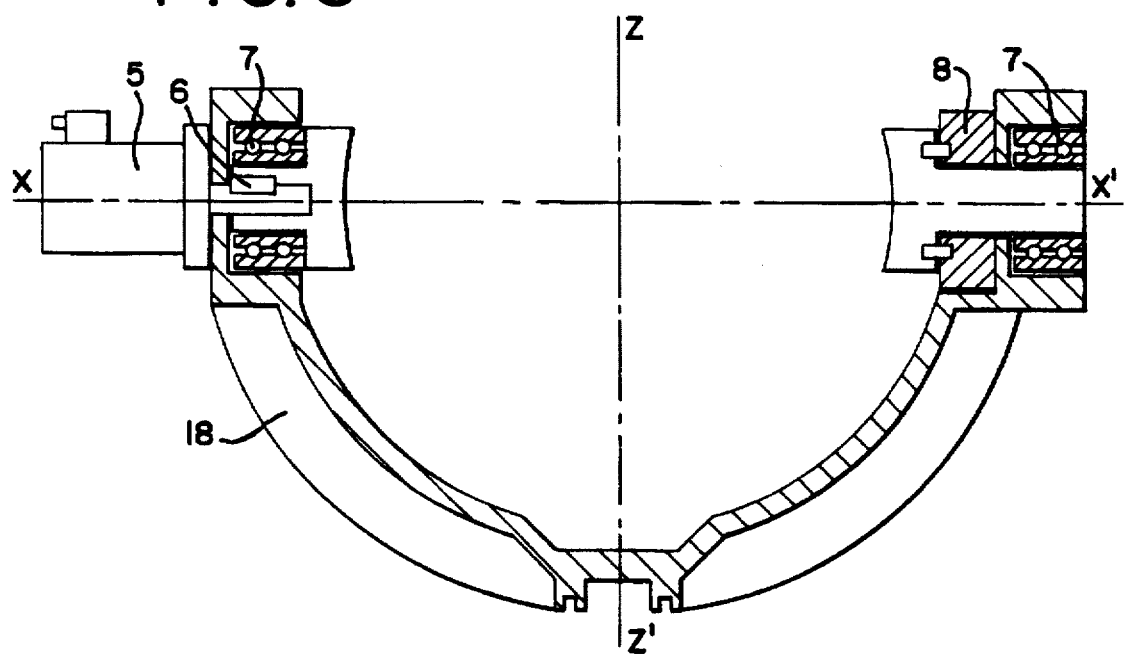
FIG. 6 is a view of the rotation subsystem around the XX' axis.
Figure 7:
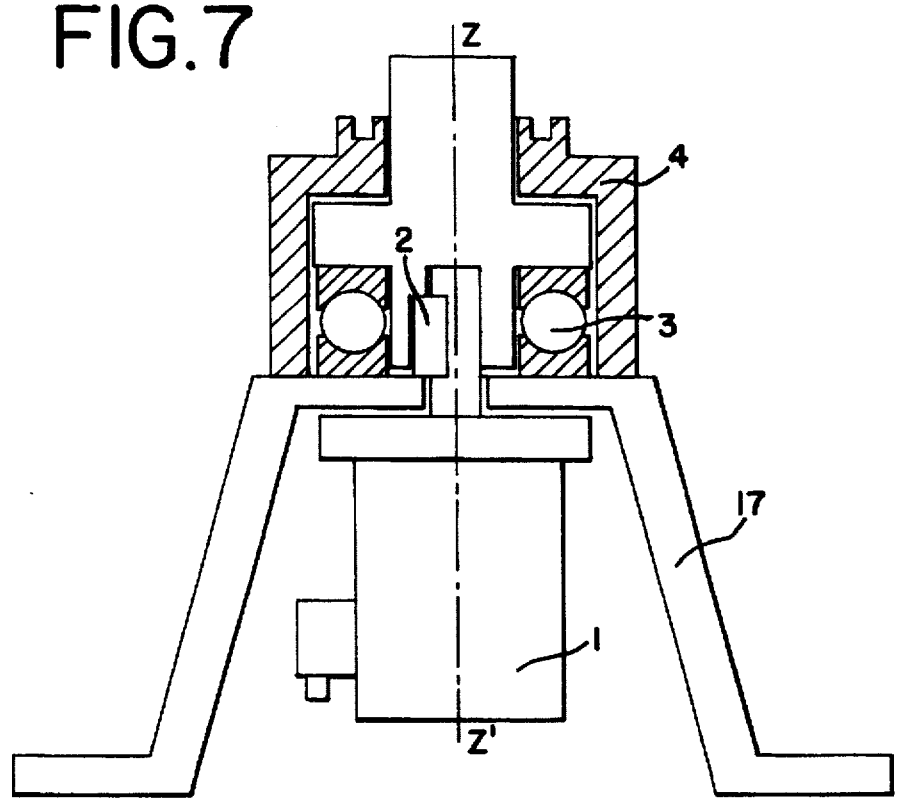
FIG. 7 is a longitudinal cut view of the rotation subsystem of the ZZ axis.

As shown in FIG. 6, the rotation subsystem around XX' axis is comprised of a second servomotor (5), a second known mechanical connection (6) kind of hinge-pin or flexible, and a second radial bearing (7) supported on one of the extremities of the beam (18). On the other extremity of the XX' rotation axle, supported on the other extremity of the beam (18), another radial bearing (7) is found, and a second energy system (8) known by the man of ordinary skill in the art, such as one composed by energy brushes and energy rings, not shown in detail in the drawings.

The rotation subsystem around YY' axis is fed by the energy system (8) located on an extremity of beam (18), of which energy is passed to the external ring (19) of the bearing (9) through the energy brushes and energy rings.

Figure 3:
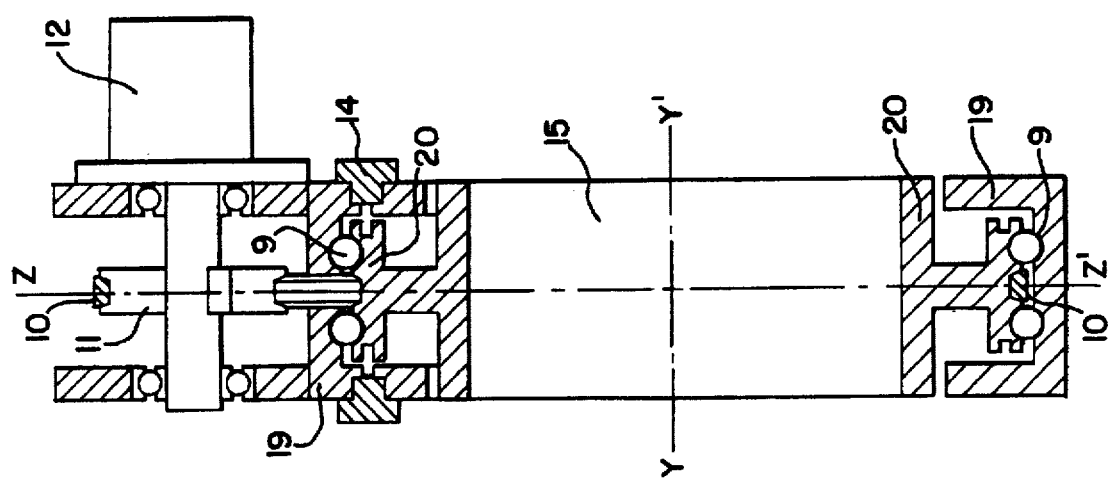
FIG. 3 is a detail view of the rotation subsystem around YY' axis.

The rotation movement around the YY' axis is done through a third servomotor (12), shown in FIG. 3.

Figure 4:
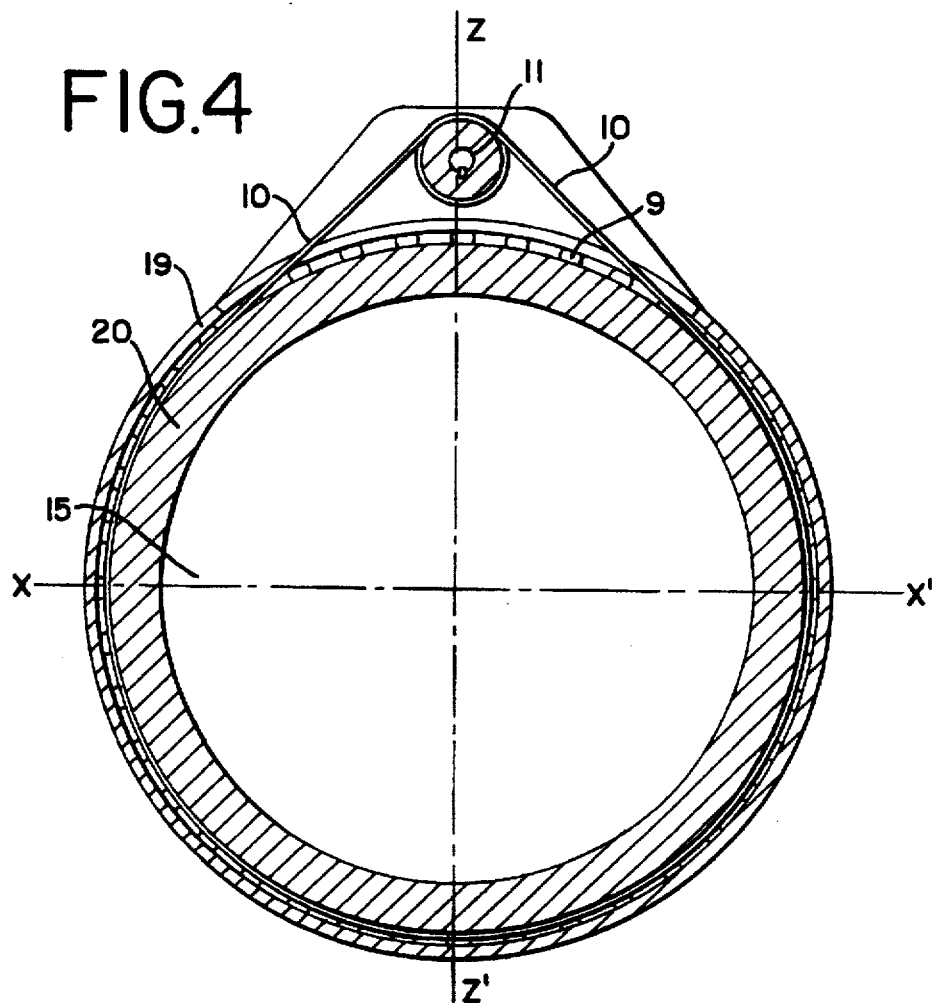
FIG. 4 is a detail xz cut view of the rotation subsystem of the YY' axis.
Figure 5:
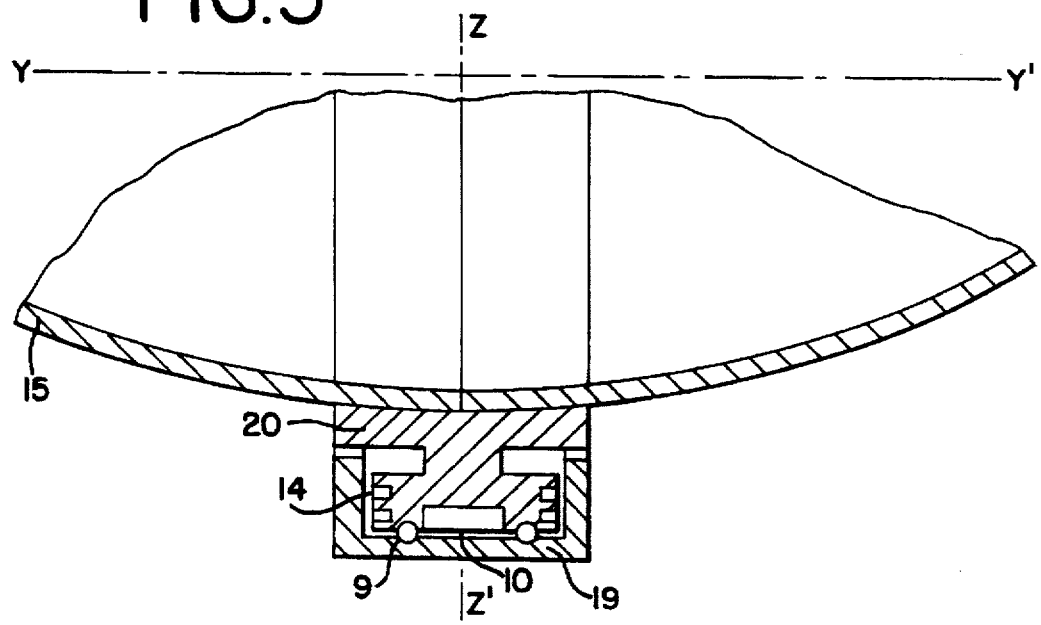
FIG. 5 is a detail yz cut view of the bearing (9) on the rotation subsystem of the YY' axis.

According to the FIGS. 3 and 4, the movement of inner ring (20) around the YY' axis is gotten through an actuation pulley (11) a transmission belt (10) and a radial bearing (9) of which the external track of rolling is the external ring (19) and of which the internal track of rolling is the inner ring (20). The external ring (19) is fixed, it does not rotate around YY' axis. This rotation is only performed by the inner ring (20) moved by transmission belt (10) that acts on the inner ring (20) on which the cabin is fixed (15), that gives it rotation.

The functioning of the simulator is done as the servomotors (1), (5) and (12) are turned on. The first servomotor (1) will perform a rotation movement of the beam (18) around the ZZ' axis, and as a consequence, to the cabin (15).

With the passage of energy through the brushes and rings, the servomotor (5) responsible for the movement around XX' axis can be started. So, the rotation movement of the servomotor (5) is transmitted to the external ring (19) of the bearing (9) by the mechanical connection (6), giving to the cabin (15) the rotation movement around XX' axis, with unlimited angle in both directions.

The third servomotor (12) attached to external ring (19) gives the rotation movement to the internal ring (20) of the bearing (9) through the pulley (11), transmission belt (10) that circle the inner ring (20). The rotation movement around YY' axis presents unlimited angle in both directions, just as those impacted to XX' and ZZ' axes.

The equipment previewed for the cabin will get energy through energy systems (14) known to the man of ordinary skill in the art, as energy brushes and energy rings.

The previous programming of movements, manual or informatized, or by internal commands installed at the cabin, starts the servomotors (1), (5), and (12) that rotate beam (18), external ring (19), inner ring (20), and cabin (15). If just one servomotor is started, the cabin components will have a circumferential rotation movement in a perpendicular plan to rotation axis. If two or three servomotors were started at the same time, the movement of each component of the cabin is spherical. Combining the rotation direction and the angular speed of the three axis is possible to simulate sensations of movements found in toys such as "Roller Coaster," "Star Wars" and "submarine." The simulator here described has industrial uses, in professional training in flight simulators and vehicles, it also has uses in medical science and robotics. The motor of the simulator is acquired by toys such as "Roller Coaster," "Star Wars" and "submarine." The simulator here described has industrial uses, in professional training in flight simulators and vehicles, it also has uses in medical science and robotics. The motor of the simulator is acquired by electro-mechanical means, using servo-systems composed by servo-controllers and servo-motors. Others devices to put the cabin in the spherical movement also can be used. This description is not limiting, and other means can used to energize the system or to substitute the bearings.

What is claimed is:

1. An electro-mechanical simulator with gravitational effects comprising:

a. a spherical cabin for containing an object whereby said spherical cabin has first, second and third axes;

b. an inner ring having an outer circumference and being attachable to said cabin;

c. an external ring having an inner circumference;

d. a bearing between said inner ring and said external ring for allowing said inner ring to move relative to said external ring about said third axis;

e. a beam;

f. a means for rotating said beam about said first axis whereby said beam is in communication with said external ring which is in communication with said inner ring such that when said beam rotates about said first axis, said external ring and said inner ring there together rotate about said first axis;

g. a means for rotating said external ring about said second axis; and h. a means for rotating said inner ring about said third axis comprising a transmission means for transmitting force substantially about an outer circumference of said inner ring.

2. An electro-mechanical simulator with gravitational effects according to claim 1, whereby said transmission means comprises a belt integral with a motor whereby said belt maintains frictional contact with said inner ring such that energizing said motor causes said inner ring to rotate about said third axis.

3. An electro-mechanical simulator with gravitational effects according to claim 1, whereby said bearing between said inner ring and said external ring extends about said outer circumference of said inner ring and said inner circumference of said external ring such that said bearing can restrict movement between said inner ring and said outer ring in all directions except about said third axis.

4. An electro-mechanical simulator with gravitational effects according to claim 1, wherein said external ring is supported by at least one substantially horizontal axle passing radially through two opposing ends of said external ring and through said beam whereby said at least one substantially horizontal axle is supported by at least one bearing on one end of said beam and at least one bearing on an opposite end of said beam.

5. An electro-mechanical simulator with gravitational effects according to claim 1, whereby said beam has connected thereto a means for rotating said external ring about a second axis and whereby said beam has a substantially vertical axle passing through an area near a center of gravity of said beam whereby said beam is rotatable about said substantially vertical axle.

6. An electro-mechanical simulator with gravitational effects according to claim 1, whereby said means for rotating said beam comprises a first bi-directional motor for rotation about said first axis, said means for rotating said external ring comprises a second bi-directional motor for rotation about said second axis, and said means for rotating said inner ring comprises said transmission means and a third bi-directional motor for rotation about said third axis, whereby each of said first, second, and third motors has at least one axle bearing and mechanical connection for allowing multiple-revolution rotation and partial-revolution rotation in both clockwise and counterclockwise directions.

7. An electro-mechanical simulator with gravitational effects according to claim 6, whereby said simulator can be oriented such that each of said first, second, and third bi-directional motors is capable of imparting a pitching, rolling, or yawing effect to said cabin.

8. An electro-mechanical simulator with gravitational effects according to claim 1, further comprising a computing means for controlling said means for moving said beam and for controlling said means for moving said external ring and for controlling said means for moving said inner ring.

9. An electro-mechanical simulator with gravitational effects according to claim 1, whereby said first axis and said second axis and said third axis are mutually perpendicular to each other.

10. An electro-mechanical simulator with gravitational effects according to claim 1, whereby said simulator can be oriented such that it is capable of imparting to said cabin a yawing effect about said first axis, a pitching effect about said second axis, and a rolling effect about said third axis.

* * * * *